United States Patent [19]

Mazzarella et al.

[11] Patent Number: 4,782,451
[45] Date of Patent: Nov. 1, 1988

[54] PROCESS FOR MAINTAINING LIQUID SUPPLY

[75] Inventors: Richard B. Mazzarella, Grand Island; John P. Borcuch, Williamsville; David E. Brown, Kenmore, all of N.Y.

[73] Assignee: Union Carbide Corporation, Danbury, Conn.

[21] Appl. No.: 93,604

[22] Filed: Sep. 8, 1987

Related U.S. Application Data

[63] Continuation of Ser. No. 676,845, Nov. 30, 1984, abandoned.

[51] Int. Cl.$^4$ .................. G06F 15/24; G01F 23/18
[52] U.S. Cl. .................. 364/510; 340/680; 340/870.16
[58] Field of Search .................. 364/442, 509, 510; 340/618, 870.16

[56] References Cited

U.S. PATENT DOCUMENTS

| | | | |
|---|---|---|---|
| 4,157,030 | 6/1979 | Keely | 73/113 |
| 4,217,644 | 8/1980 | Kato et al. | 364/442 |
| 4,275,382 | 6/1981 | Jannotta | 364/509 |
| 4,296,472 | 10/1981 | Sarkis | 364/509 |
| 4,349,882 | 9/1982 | Asmundsson et al. | 364/509 |
| 4,387,434 | 6/1983 | Moncrief et al. | 364/509 |
| 4,602,344 | 7/1986 | Ferretti | 364/509 |

Primary Examiner—Felix D. Gruber
Attorney, Agent, or Firm—Stanley Ktorides

[57] ABSTRACT

A method for ensuring that sufficient liquid is maintained in a liquid reservoir which is distant from a liquid supply station, comprising periodically determining the amount of liquid in the reservoir and sending the periodic determinations to a signal receiver for determination of the actual usage rate of liquid from the reservoir, sending a signal from the receiver to a remote supply station if certain defined mathematical operations indicate that liquid resupply is needed, and sending liquid from the remote supply station to the liquid reservoir.

12 Claims, 1 Drawing Sheet

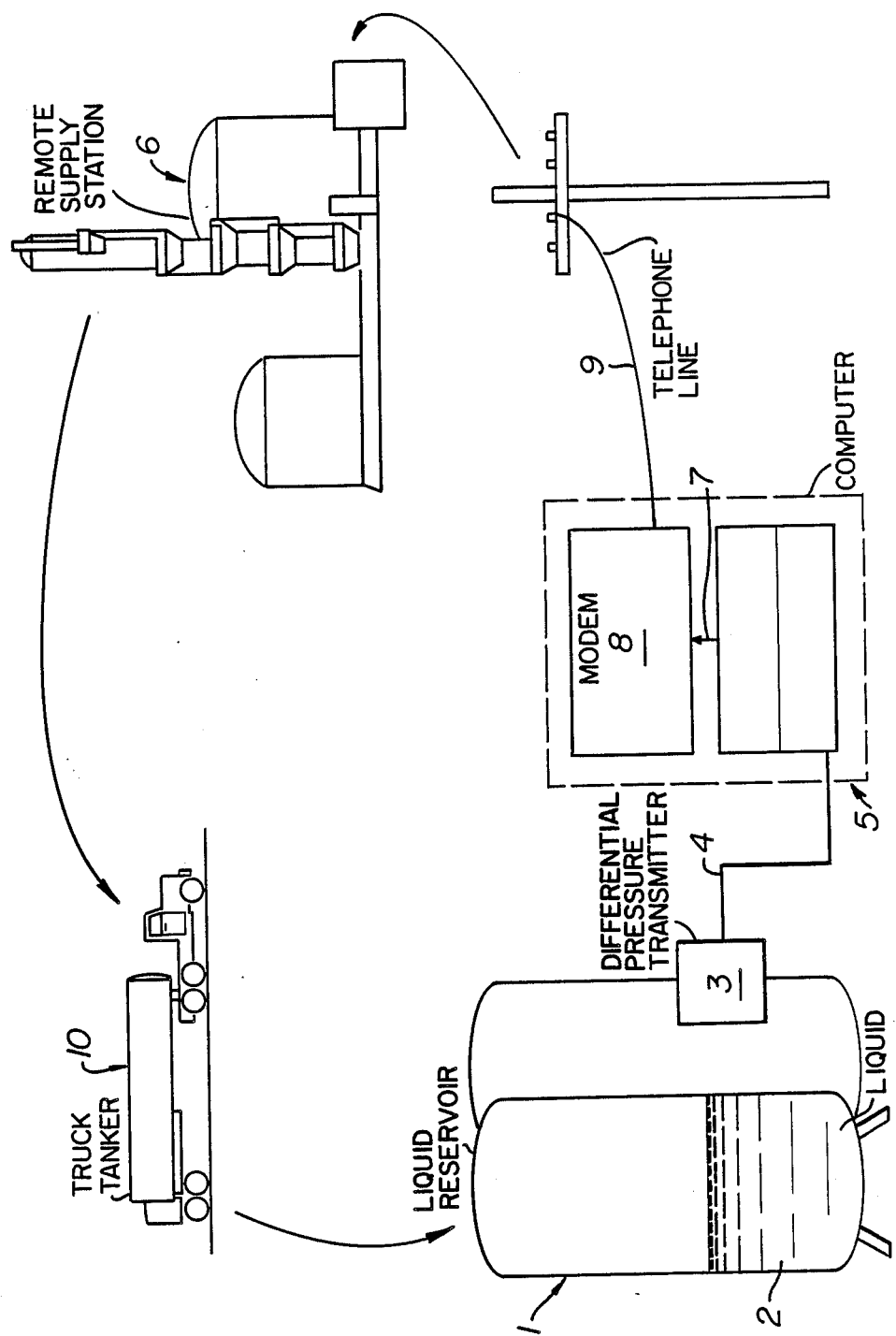

PROCESS FOR MAINTAINING LIQUID SUPPLY

This application is a continuation of prior U.S. application Ser. No. 676,845, filing date 11/30/84 and now abandoned.

DESCRIPTION

1. Technical Field

This invention relates to a process for maintaining a supply of liquid in a reservoir.

2. Background Art

The reservoir that is of particular interest here is a storage tank for cryogenic liquids such as liquid nitrogen. The usual procedure for maintaining a supply of liquid nitrogen on hand is to provide some sort of gauge, which indicates liquid level in the tank. When the gauge indicates that the level has dropped to a certain point, e.g., one-fifth full, the customer calls for a refill or, alternatively, the supplier refills the tank on a weekly or monthly basis depending on estimated usage. Unfortunately, these procedures do not take into account erratic usage, i.e., a sudden upsurge in demand, which may result in the contents of the tank being used up before the new supply arrives. The same problem can arise simply through human error such as failure to read, or a misreading of, the liquid level gauge, or an underestimation of usage. Further, periodic deliveries based on estimated usage are considered to be inefficient because the timing of the delivery very seldom corresponds to industrial requirements, which can fluctuate over a wide range in a short period of time due to changing production and inventory requirements, plant shut-downs or slow-downs, or other market variables. Efficiency, in this case, is measured in terms of amount of product delivered per miles traveled. To make bulk deliveries to hundreds of customers when half or less have a real need gives some indication of the magnitude of the problem.

DISCLOSURE OF THE INVENTION

It is an object of this invention, therefore, to render obsolete customer tank monitoring and periodic deliveries while accommodating erratic usage.

Other objects and advantages will become apparent hereinafter.

In accordance with the invention, a process has been discovered for maintaining a supply of liquid in a reservoir by initiating refill from a remote supply station comprising the following steps, carried out in a continuous manner:

(a) sensing a first amount of liquid in the reservoir and transmitting this information via a first signal to data processing means;

(b) sensing a second amount of liquid in the reservoir at the end of a predetermined unit of time and transmitting this information via a second signal to the data processing means;

(c) processing the first and second signals in the data processing means to (i) determine the change in liquid amount between the first and second signals and (ii) divide the change in liquid amount by the unit of time to generate a third signal indicating the rate of change in liquid amount per unit time;

(d) generating a fourth signal in the data processing means to indicate a predetermined time required to refill the reservoir;

(e) processing two of the signals selected from the group consisting of the second, third, and fourth signals in the data processing means as follows:
   (i) the second and third signals to generate a fifth signal indicating the time in which the reservoir will be emptied;
   (ii) the second and fourth signals to generate a fifth signal indicating the maximum rate of change in liquid amount per unit time; and
   (iii) the third and fourth signals to generate a fifth signal indicating the minimum amount of liquid required in the reservoir;

(f) in the data processing means, processing the fifth signal against the signal, which is not processed in step (e); and (g) in the event that the fifth signal matches the signal, which is not processed in step (e), transmitting a sixth signal from the data processing means to data receiving means located at the remote supply station, said sixth signal initiating refill at the remote supply station.

DESCRIPTION OF THE DRAWING

The sole FIGURE is a simplified schematic representation of one preferred embodiment of the invention.

Referring now to the FIGURE, liquid reservoir 1 contains liquid 2. The amount of liquid 2 in reservoir 1 is determined by any suitable means. The FIGURE illustrates a preferred liquid determination wherein differemtial pressure transmitter 3 measures the difference between the gas phase and liquid phase pressures which is then converted to an electrical analog signal representing the actual tank contents. The liquid determination is sent 4 to signal receiving means 5 such as a computer or microprocessor wherein the subtraction, division and other defined mathematical steps are carried out.

At the defined time a signal is sent from receiving means 5 to remote supply station 6. In the embodiment illustrated in the FIGURE. the computer sends the signal to the remote supply station by passing it electronically 7 to modem 8 and through telephone lines 9 to the remote supply station. In the FIGURE, remote supply station 6 is illustrated as being a production plant with two liquid storage tanks.

In response to the signal to the remote supply station, liquid is sent from remote supply station 6 to reservoir 1. The FIGURE illustrates a preferred method wherein liquid from the remote supply station is passed into truck tanker 10 which is then driven to reservoir 1 and passes liquid into reservoir 1.

DETAILED DESCRIPTION

The process can be carried out using a pressure differential transmitter to provide the first and second signals, a microcomputer to provide the other signals and the processing of the signals, and a microcomputer/telephone modem combination to transmit the sixth signal to the remote supply station. It is a feature of this invention that all of the equipment which can be used to carry out the process, i.e., the storage tank or reservoir, the pressure differential transmitter, the microcomputer, the telephone modem, the remote supply station, and the connecting circuitry are relatively inexpensive and conventional off-the-shelf items, which can be integrated into a system meeting process requirements.

Typical essentials, equipmentwise, are liquid level sensing means; a transmitter which monitors process variables and sends an electrical signal proportional to liquid level; a microcomputer comprising a central data processing unit, stored memory capability, a volatile memory, and a communication line; and communication equipment for data dispersal. Power sources, circuitry, and delivery equipment fill out the basic equipment list.

Measuring the liquid contents of a cryogenic storage tank is done indirectly to minimize heat leak into the tank. Therefore, liquid contents for any given storage tank geometry and liquid density can be determined by measuring the differential pressure developed by the liquid head and then using the pressure reading, in inches of water, to calculate tank contents in pounds or gallons of liquid. When the cross-sectional area of the tank is constant relative to the height, the geometry factor becomes moot and the actual value of contents will be directly proportional to the tank reading. In this case, the amount of liquid in the tank (the tank inventory) can be determined directly from the liquid level. In other cases, a geometry factor has to be programmed into the computer to arrive at the amount of liquid in the tank. A differential pressure transmitter can be used to measure the difference between the gas phase and liquid phase pressures. The pressure difference can then be converted to an electrical analog signal representing the actual tank contents. The transmitter can be added to existing storage tanks by connecting gas phase and liquid phase instrument taps to the transmitter. A mechanical differential pressure indicator can also be part of the equipment. The individual analog signals from the transmitter are then fed to the microcomputer for interpretation.

A single board microcomputer capable of accepting multiple analog and status inputs is adequate for the process. A general programming format can easily be tailored with respect to tank size, type of liquid, average consumption, or other particulars. The programming uses changes in storage tank liquid amount or level as a means of monitoring and also forecasting future tank contents. Along with indicating when a refill or delivery is needed at a predetermined re-order point, the microcomputer compares the actual liquid level to the average use rate and predicts when the tank contents will be depleted. In a first embodiment of subject process, when the time to empty is equal to the time to refill, a signal is transmitted to the remote supply station. The term "time to empty" is, of course, the time it will take until the tank is empty. The term "time to refill" is the time it takes the remote supply station to fill a trailer or other carrier (e.g., a barge or rail car) with liquid, travel to the customer's site, and refill the customer's tank, plus a safety factor, which is simply extra time included in the time to refill to cover unforeseen eventualities. The safety factor is generally an arbitrary figure based on experience. The time to refill can, of course, be varied to take into account changing conditions such as time of day or day of week, but these variations are merely a matter of programming step (d) into the computer.

The first and second signals are generated at the storage tank. The predetermined unit of time is programmed into the data processor (or computer). Typically, the signals from the tank are transmitted continuously and the first and second signals are continuously processed to determine change in liquid level and divide the change by the unit of time, i.e., the time interval between first and second signals. The processing generates a third signal, which represents the rate of change in liquid level per unit time. A fourth signal is programmed into the computer to represent the time to refill. Then, again in the first embodiment, the data processor processes the second signal against the third signal to determine the time it will take for the tank to be emptied, i.e., time to empty, at the third signal rate. This is accomplished by dividing the second signal by the third signal. The time to empty is converted to a fifth signal by the data processor. The fifth signal is then processed against the programmed fourth signal, the time requirement to refill the tank.

When the fifth signal matches the fourth signal, a sixth signal is generated by the data processor which is transmitted to the communication means and the refill procedure is then initiated. It will be understood by those skilled in the art that the term "matches" insofar as the fourth and fifth signals are concerned is merely a cross-over point, e.g., a curve crossing a straight line on a graph, the sixth signal being triggered when the fifth signal is on target or has passed the target provided by the fourth signal. In other words, the point at which the "time to empty" is equal to or less than the "time to refill". In the case where the liquid level is monitored at very short time intervals, the fourth and fifth signals will literally match up. Where the time intervals are longer, the fifth signal may jump the cross-over point, but, as pointed out, the computer is programmed to respond to the cross-over no matter how it is achieved. Further, the computer is usually programmed to call for a refill when the liquid level falls to a certain point regardless of rate of use.

Instead of processing time to empty vs. time to refill, two more embodiments concerning maximum rate and minimum amount can be used. The second embodiment processes the second and fourth signals together; dividing the second signal by the fourth to arrive at a "maximum rate of change in liquid amount per unit time". This maximum rate of change reflects the upper limit of change in liquid amount or level which will provide sufficient liquid to last from the point of time refill is initiated to the point of time refill occurs at the current rate of use. Thus, if the rate of change in liquid amount is to be faster than maximum, the liquid would not last until the refill occurred. This undesirable result is avoided by subject process. In sum, when the current rate (third signal) is equal to or greater than the maximum rate (fifth signal), the signals match and the sixth signal is triggered.

The third embodiment multiplies the third signal by the fourth signal to arrive at a "minimum amount of liquid required in the reservoir". This minimum amount required is constantly changing as the current rate (third signal) changes. It is defined as the minimum amount which is required in the tank to last, at the current rate, until the tank can be refilled, i.e., to last for the time to refill period. When the minimum amount required (fifth signal) is equal to or greater than the current liquid amount (second signal), the signals match and the sixth signal is transmitted.

The refill signal is preferably dispatched by an automatic dialing modem connected to the microcomputer. The modem message is recorded by dedicated equipment at the remote supply station. If the call does not go through on the initial attempt, it is recommended that the call be automatically repeated until the message is received and that all information is recorded at the point of transmission and the point of receipt. Thus, at any time, supplier and customer with access to the microcomputer by telephone or otherwise can determine the present status of the liquid in the storage tank.

The advantages of subject process lie in improved customer service; streamlined distribution operations; improvement in amount of product delivered per miles traveled; product deliveries being coordinated to present requirements rather than prior usage; avoidance of the human element in monitoring inventories and reordering; and lower capital expenses, i.e., smaller signal storage tanks and supply equipment can be used. Last, but not least, is the continuous mode in which the process is carried out, i.e., the signals are given at a predetermined rate and are processed as received to provide the continuous monitoring of usage with the resultant refill signal being transmitted in a timely fashion.

The liquid level may be measured by a level sensing means such as Rosemount Model 1151DP differential pressure transmitter and the actual contents of the tank calculated from tank geometry and liquid density. Typical level sensing means utilize differential pressure, ultrasonic, or radioactive methods. The transmitting means are devices which will send an analog electrical signal proportional to the tank contents; linear proportionality is not necessary. Linear proportionality is advantageous, however, in that such a system is self-calibrating, i.e., effectiveness will not be hampered by signal drift during the life of the unit. Elimination of the need for calibration is important since operational error due to improper calibration is a typical instrumentation problem.

Examples of devices which can be used in place of the pressure differential transmitter are load cells and ultrasonic and variable resistance devices. Preferred characteristics of these devices are analog or digital outputs proportional to contents.

The microcomputer is user programmable and able to provide physical control of the message transmitting means. The computer includes a central processing unit for calculations, a permanent memory, a volatile memory, and a communication compatible link to the message transmitting means. The permanent memory can be in the form of a PROM chip or may be stored in battery-backed up RAM, magnetic discs, magnetic tape, or bubble memory. The volatile memory can be a RAM chip, and the communication means can be a communication line such as an RS232 link, a data bus, or a digital to analog converter. Any computer which will accept the process program can be used, although the microcomputer is favored because of the following characteristics: can accept wide environmental temperature changes, is low in cost, has low power consumption, and can be supplied by many vendors.

Communication means, other than the telephone modem, which can be used are radio communications, direct wired intercommunication devices, or photoelectric devices.

The power source is conveniently electrical, but power may be derived from solar or other sources. Preferably, the power is isolsted from surges and other disturbances such as lightning. A continuous power source with back-up is desirable, but the process can be carried out at discrete time intervals. Of course, when the system is in the "on" mode, the power must be continuous.

The "predetermined unit of time" is selected by the operator based on past experience. While any unit of time can be selected between the first and second signals, units of time in the range of about five minutes to about two hours are desirable with a range of about ten minutes to about one hour being preferred. In any case, the longest useful unit of time is approximately equal to the time it takes to use about ten percent of the total tank volume. This, of course, depends on the use rate so projected or historical use rate data is taken into consideration in arriving at the most practical unit of time for each application. The time to refill is also based on experience with the selected mode of transportation, distance from remote supply to customer's site, and time to execute.

As noted, a differential pressure transmitter measures the contents of the tank or reservoir. The contents of the tanks are sensed continuously. Generally, the computer can receive the transmitted signals at intervals measured in seconds; however, reception at intervals of about 10 seconds to five minutes are quite satisfactory with intervals of about two to four minutes being a practical selection. Typically, a signal transducer amplifies and sends the first and second signals to an analog to digital converter, which changes the signals to binary numbers, a form that can be utilized by the microcomputer. The microcomputer is programmed to process sets of two signals, the two signals being separated by the unit of time. The microcomputer then processes the first and second signals, generating a third signal which can be processed against the second signal to determine time to empty via a fifth signal. The fifth signal is processed against the fourth signal, i.e., time to refill. When the fifth signal and fourth signal match, i.e., time to empty is equal to or less than time to refill, a sixth signal is generated which, in effect, sounds the refill alarm. The computer can, of course, send additional information to the remote supply station or to the customer such as use rate or current contents. The sixth signal can activate the telephone modem, a warning light, or any other selected means of communication.

The first and second signals can be repeated to obtain an average liquid level over a particular time period, usually a short period. It is generally advisable to employ some type of filtering to suppress spurious signals, which may result from signal interference or momentary sharply increased or decreased flow from the tank, and also to prevent a refill message from being sent as a result of intermittent periods of high product usage. This deviation can be accommodated by the utilization of a running average, a straight average or a weighted average. The first and second signals are each based on several readings of liquid inventory, e.g., the current value for liquid contents can be equal to 0.9 times the preceding value plus 0.1 times the current reading. Subsequent values would be factored into the weighted running average in a similar manner. The filtered value at the end of a unit of time, during which a total of perhaps 50 readings would be taken, would become the second signal. The first signal is the filtered value at the end of the previous unit of time. Of course, at the start of the process, the first signal is simply equal to the filled tank reading. In this manner, a new signal, which may have spurious elements, is not too heavily weighted and the preceding signals are of constantly decreasing importance to the derived signal.

The first and second signals can represent liquid levels, which, in a right circular cylinder, are directly proportional to the contents. As noted above, the geometry of the tank, however, might introduce non-linearity. For example, the amount of liquid in a spherical tank is not directly proportional to the liquid level (or height of the liquid). In this case, the formula for the volume of a sphere must be integrated with the liquid height to provide a true reading of tank contents. Where the level sensing instrumentation is non-linear, similar corrections have to be made. The advantage of the microcomputer is most readily observed in these situations because it can be easily programmed to accommodate various geometries without changing the instrumentation.

The logic of the process can be exemplified by the following equations wherein

A = time to refill
B = second liquid level
C = first liquid level
D = unit of time, i.e., time elapsed between reading of C and B.

$$B \div \frac{C-B}{D} \leq A \text{(fourth signal)} \quad \text{(i)}$$

$$B \div A \geq \frac{C-B}{D} \text{ (third signal or current rate)} \quad \text{(ii)}$$

$$\frac{C-B}{D} \times A \geq B \text{(second signal)} \quad \text{(iii)}$$

It will be understood that D, the unit of time, can be fixed throughout the process or can be programmed to become shorter as the liquid level becomes lower and lower. In the latter case, there is less likelihood of the second reading (B) processed after the time to refill has passed.

Other refinements can be incorporated into subject process. For example, the tank contents of a cryogenic liquid is, among other things, dependent on density and density is dependent on temperature. The tank contents temperature can be read by a temperature sensor such as a thermocouple and the value transmitted to a microcomputer programmed to correct the first and third signals concerning liquid level. An even better approach is to measure absolute pressure and, assuming equilibrium in the tank, obtaining the temperature from a programmed data bank comprising the vapor/liquid equilibrium curve of the cryogen.

The invention is illustrated by the following example:

The process is carried out as described above on a liquid nitrogen storage tank for a customer whose use rate is erratic. The storage tank is a right circular cylinder and a differential pressure transmitter is used. The transmitter sends a 4 to 20 milli-amp signal via direct wiring. The number of milli-amps correspond, respectively, to empty to full tank contents. A resistor changes the current signal to 1 to 5 volts and the A/D converter digitizes the signal to a binary number between 800 to 4000 counts. The microcomputer is comprised of a central processing unit, a PROM chip, a RAM chip, and a RS232 communication link to a telephone modem.

The modem is connected by a telephone jack to standard voice quality lines in order to call a printer located at a remote supply station. Power from the system is supplied by standard 220 volts AC isolated by power transformers.

After the system is turned on, the computer program causes it to send a "power-on" message to the remote location. The computer then begins to receive liquid level signals every three minutes The signals are filtered as recited above, i.e., liquid level = 0.9 value for immediately preceding liquid level plus 0.1 reading for desired liquid level. The microcomputer processes the first and second signals to determine change in liquid level, divide change by unit time, which, in this case, is one hour, and generate a third signal representing rate of change in liquid level per unit time. The third and fourth signals are then multiplied to determine the minimum amount of liquid required in the tank. As noted, this provides enough liquid to last, at the current rate, for the time to refill period and generates a fifth signal to this effect. The fifth signal is then processed against the second signal. Matching signals generate a sixth signal initiating the modem and the telephone call to printer. If the call is not successful, it is repeated every 15 minutes. The process is repeated either when the fifth and sixth signals fail to match or the tank is refilled (at least 10% by volume more than the second liquid level).

At the remote supply station the refill message is received by a printer, which includes an attention light to indicate an incoming message. The message is programmed to identify the tank and relate current rate of use and current liquid level.

We claim:

1. A method for maintaining a supply of liquid in a reservoir while ensuring that liquid is not delivered to the reservoir after it is empty or before the reservoir requires refilling, comprising sending liquid to the reservoir from a supply station remote to the reservoir so as to have a predetermined supply time for supplying liquid to the reservoir, by the steps of:

(A) determining a first amount of liquid in the reservoir, after a period of time determining a second amount of liquid in the reservoir, sending each determination to signal receiving means, subtracting the second amount from the first amount, and dividing the remainder by the period of time to obtain the time rate of change of the liquid; and (B) dividing the second amount by the time rate of change and, if this first quotient is equal to or less than the predetermined supply time, sending a signal from the receiving means to a supply station remote to the reservoir and thereafter sending liquid in response to said signal from the supply station to the reservoir;

(C) dividing the second amount by the predetermined supply time and, if this second quotient is equal to or less than the time rate of change, sending a signal from the receiving means to a supply station remote to the reservoir and thereafter sending liquid in response to said signal from the supply station to the reservoir; or (D) multiplying the time rate of change by the predetermined supply time and, if this product is equal to or greater than the second amount, sending a signal from the receiving means to a supply station remote to the reservoir and thereafter sending liquid in response to said signal from the supply station to the reservoir.

2. The method of claim 1 wherein the liquid is a cryogenic liquid.

3. The method of claim 2 wherein the cryogenic liquid is liquid nitrogen.

4. The method of claim 1 wherein the amount of liquid in the reservoir is determined by measuring the differential pressure of the liquid in the reservoir.

5. The method of claim 1 wherein the time period between the determination of the first and second amounts is within the range of from 10 seconds to 5 minutes.

6. The method of claim 1 wherein the time period between the determination of the first and second amounts is within the range of from 2 to 4 minutes.

7. The method of claim 1 wherein the subtraction and division of step (A) are carried out using a computer.

8. The method of claim 7 wherein the computer is distant from the reservoir and the readings of the first and second amounts are sent to the computer by electrical signal.

9. The method of claim 8 wherein the divisions of steps (B) and (C) and the multiplication of step (D) are carried out using the computer.

10. The method of claim 9 wherein the comparisons of steps (B), (C) and (D) are carried out using the computer.

11. The method of claim 10 wherein the supply station is distant from the computer, further comprising sending a refill signal from the computer to the supply station by electronic means.

12. The method of claim 11 wherein the electronic means is a telephone signal.

* * * * *